US010125738B2

(12) United States Patent
Clements (10) Patent No.: US 10,125,738 B2
(45) Date of Patent: Nov. 13, 2018

(54) METHOD FOR ELECTRICAL POWER GENERATION UTILIZING A TURBINE SECURED TO A SUBSEA PIPE, THE TURBINE HAVING TURBINE BLADES ENCIRCLING AN OUTER PERIPHERY OF THE SUBSEA PIPE

(71) Applicant: GE Oil & Gas UK Limited, Bristol (GB)

(72) Inventor: Richard Clements, Durham (GB)

(73) Assignee: GE OIL & GAS UK LIMITED, Bristol (GB)

( * ) Notice: Subject to any disclaimer, the term of this patent is extended or adjusted under 35 U.S.C. 154(b) by 0 days.

(21) Appl. No.: 14/915,578

(22) PCT Filed: Sep. 23, 2014

(86) PCT No.: PCT/GB2014/052896
§ 371 (c)(1),
(2) Date: Feb. 29, 2016

(87) PCT Pub. No.: WO2015/059444
PCT Pub. Date: Apr. 30, 2015

(65) Prior Publication Data
US 2016/0237979 A1    Aug. 18, 2016

(30) Foreign Application Priority Data

Oct. 21, 2013   (GB) .................................. 1318560.8

(51) Int. Cl.
*F02B 13/10*   (2006.01)
*F03B 13/10*   (2006.01)
(Continued)

(52) U.S. Cl.
CPC .............. *F03B 13/10* (2013.01); *F03B 13/00* (2013.01); *H02K 5/132* (2013.01); *H02K 7/1823* (2013.01);
(Continued)

(58) Field of Classification Search
CPC .... F03B 13/00; F03B 13/10; F05B 2220/602; F05B 2220/7068; F05B 2240/911;
(Continued)

(56) References Cited

U.S. PATENT DOCUMENTS 1,371,836 A * 3/1921 Antz ..................... F03B 17/061
                                              416/10
3,342,267 A * 9/1967 Cotter .................... E21B 36/04
                                              166/60
(Continued)

FOREIGN PATENT DOCUMENTS

FR    2960266 A1 * 11/2011  .............. F03B 13/10
GB    2388164        11/2003
(Continued)

OTHER PUBLICATIONS

"Generator Systems for Marine Current Turbine Applications: A Comparative Study" IEEE Journal of Oceanic Engineering, vol. 37, No. 3, Jul. 2012.
(Continued)

*Primary Examiner* — Tulsidas C Patel
*Assistant Examiner* — S. Mikailoff
(74) *Attorney, Agent, or Firm* — Knobbe, Martens, Olson & Bear, LLP (57) ABSTRACT

A method and apparatus for generating electrical power are disclosed. The method includes the steps of turning turbine blades of at least one turbine provided at a region of a subsea pipe or umbilical via a respective motion of seawater through a swept area associated with the turbine blades and
(Continued)

generating electrical power responsive to turning of the turbine blades.

21 Claims, 7 Drawing Sheets (51) Int. Cl.
*F03B 13/00* (2006.01)
*H02K 7/18* (2006.01)
*H02K 5/132* (2006.01)

(52) U.S. Cl.
CPC . *F05B 2220/602* (2013.01); *F05B 2220/7068* (2013.01); *F05B 2240/911* (2013.01); *F05B 2240/97* (2013.01); *Y02B 10/50* (2013.01); *Y02E 10/32* (2013.01)

(58) Field of Classification Search
CPC .. F05B 2240/97; H02K 5/132; H02K 7/1823; Y02B 10/50; Y02E 10/32
See application file for complete search history.

(56) References Cited

U.S. PATENT DOCUMENTS

| | | | | |
|---|---|---|---|---|
| 4,317,330 | A * | 3/1982 | Brankovics | F03B 17/061 290/54 |
| 4,412,417 | A * | 11/1983 | Dementhon | F03B 13/183 415/7 |
| 4,520,273 | A * | 5/1985 | Rowe | F03B 17/063 290/52 |
| 4,692,631 | A * | 9/1987 | Dahl | F01D 15/10 290/44 |
| 4,722,665 | A * | 2/1988 | Tyson | F03B 3/04 415/7 |
| 4,850,190 | A * | 7/1989 | Pitts | F03B 13/10 290/53 |
| 5,324,988 | A * | 6/1994 | Newman | F03B 13/148 290/45 |
| 5,839,508 | A * | 11/1998 | Tubel | E21B 41/0085 166/65.1 |
| 6,253,700 | B1 * | 7/2001 | Gorlov | F03B 3/00 114/242 |
| 6,616,402 | B2 * | 9/2003 | Selsam | F03D 1/025 415/3.1 |
| 8,188,613 | B2 * | 5/2012 | Lee | B60K 7/00 290/1 C |
| 8,464,990 | B2 * | 6/2013 | Flores | F03D 9/00 248/178.1 |
| 9,046,074 | B2 * | 6/2015 | Patel | F03D 3/005 |
| 9,057,357 | B2 * | 6/2015 | Patel | F03D 9/021 |
| 9,249,783 | B2 * | 2/2016 | Selsam | F03D 1/025 |
| 9,279,407 | B2 * | 3/2016 | Sinclaire | E02B 9/08 |
| 2002/0192068 | A1 * | 12/2002 | Selsam | F03D 1/025 415/3.1 |
| 2005/0001432 | A1 | 1/2005 | Susman et al. | |
| 2005/0179263 | A1 | 8/2005 | Johansen | |
| 2007/0077145 | A1 * | 4/2007 | Kinkaid | F03D 3/061 416/197 A |
| 2009/0309367 | A1 * | 12/2009 | Perner | F03B 11/00 290/54 |
| 2010/0013238 | A1 * | 1/2010 | Jessie | F03D 3/007 290/55 |
| 2010/0266406 | A1 * | 10/2010 | Eielsen | F03B 17/061 416/84 |
| 2010/0307762 | A1 * | 12/2010 | Howard | E21B 17/012 166/350 |
| 2011/0012361 | A1 * | 1/2011 | Lee | B60K 7/00 290/55 |
| 2011/0025070 | A1 * | 2/2011 | Price | F03D 3/005 290/55 |
| 2011/0062717 | A1 * | 3/2011 | Price, Jr. | F03D 3/005 290/55 |
| 2011/0084490 | A1 | 4/2011 | Knox | |
| 2011/0107684 | A1 * | 5/2011 | Flores | F03D 9/00 52/29 |
| 2011/0316282 | A1 * | 12/2011 | Holstein | F03B 13/10 290/54 |
| 2012/0247782 | A1 * | 10/2012 | Smith | E21B 17/012 166/350 |
| 2012/0248776 | A1 | 10/2012 | Nanehkaran | |
| 2013/0147199 | A1 * | 6/2013 | Zambrano | F03B 17/063 290/54 |
| 2014/0252770 | A1 * | 9/2014 | Patel | F03D 9/021 290/50 |
| 2014/0252773 | A1 * | 9/2014 | Patel | F03D 3/005 290/55 |
| 2016/0186729 | A1 * | 6/2016 | Aixala | F03B 13/10 290/55 |
| 2016/0237979 | A1 * | 8/2016 | Clements | F03B 13/00 |

FOREIGN PATENT DOCUMENTS

| | | | | |
|---|---|---|---|---|
| GB | | 2400632 | 10/2004 | |
| JP | | S61 160580 | 7/1986 | |
| NL | | 1037011 C | * 12/2010 | F03D 3/062 |
| WO | WO 9008881 A1 | * 8/1990 | B63J 3/04 |
| WO | WO 97/23708 | 7/1997 | |
| WO | WO 2007/055585 | 5/2007 | |
| WO | WO 2013/017215 | 2/2013 | |

OTHER PUBLICATIONS

International Search Report and Written Opinion for International App. No. PCT/GB2014/052896 dated Dec. 5, 2014.

* cited by examiner

METHOD FOR ELECTRICAL POWER GENERATION UTILIZING A TURBINE SECURED TO A SUBSEA PIPE, THE TURBINE HAVING TURBINE BLADES ENCIRCLING AN OUTER PERIPHERY OF THE SUBSEA PIPE

The present invention relates to a method and apparatus for generating electrical power. In particular, but not exclusively, the present invention relates to a method of generating electrical power by turning blades of a turbine carried on a subsea pipe or umbilical via motion of seawater through a swept area associated with the turbine blades.

Traditionally, flexible pipe is utilised to transport production fluids, such as oil and/or gas and/or water, from one location to another. Flexible pipe is particularly useful in connecting a subsea location to a further subsea location or a sea level location. Flexible pipe is generally formed as an assembly of a segment of flexible pipe body and one or more end fittings in which ends of the flexible pipe body are terminated. The pipe body is typically formed as a composite of tubular layers of material that form a fluid and pressure containing conduit. The pipe structure allows large deflections without causing bending stresses that impair the pipe's functionality over a desired lifetime. Flexible pipe may be utilised as a flow line at a subsea location and alternatively may be used as a jumper or riser or the like.

Other elongate and to some extent flexible elements are known that can be used at subsea locations. For example umbilicals are utilised to carry control wires or power cables or the like from one location to another and these are typically protected via an outer sheath.

Traditionally metal pipe is also utilised to transport production fluids, such as oil and/or gas and/or water from one location to another. Metal pipe is locally rigid but because of the large lengths of the pipe can to some extent be flexible. Steel catenary risers (SCRs) are an example of the use of metal pipes in subsea locations.

It is known that from time to time auxiliary equipment is located at a subsea location and that such auxiliary equipment requires electrical power to operate. For example monitoring systems are often used to monitor one or more operational parameters associated with a pipeline or other structure and these systems typically require sensors and/or analysis equipment which require power. Conventionally such auxiliary equipment has been provided with power locally by an exhaustible power source such as a battery which provides the equipment with a requisite amount of power for a predicted lifetime. However such limited power lifetimes can reduce the overall utilisation of auxiliary equipment and can lead to a requirement for refit of a new power source which can be inconvenient and/or costly.

As an alternative to providing a local temporary power source it is known that an electrical connection can be made to the auxiliary equipment at a particular given location with the connection leading from that location typically to a remote location such as an overland or above sea level power source. Such mechanisms for power delivery enable auxiliary equipment to function over long periods of time but can cause problems. For example electrical connectors of great length can be required. These can be costly and are prone to failure and/or damage. Equally if an onshore or above sea level source of energy fails then the auxiliary equipment connected to it can cease to function.

It is an aim of the present invention to at least partly mitigate the above-mentioned problems.

It is an aim of certain embodiments of the present invention to provide a method and apparatus which can generate electrical power locally near a region of a subsea pipe or umbilical or other such structure.

It is an aim of certain embodiments of the present invention to endlessly generate electrical power via respective motion of sea water through a swept area of turbine blades of a turbine which can be located or is located subsea on a pipe or umbilical or other such structure.

It is an aim of certain embodiments of the present invention to provide dynamic control over the movement of a riser pipe in a water column with an ability to generate power from the current and/or tidal action experienced in the area.

It is an aim of certain embodiments of the present invention to utilise the movement of a riser pipe in a water column as a result of the current and/or tidal action experienced in the area to generate power by means of turbines and associated turbine blades positioned on and attached to the riser pipe.

It is an aim of certain embodiments of the present invention to generate electricity locally in sufficient amounts to power monitoring and communication systems and other such auxiliary equipment to enable systems remote from more permanent power reserves to operate independently of umbilical-like connections.

It is an aim of certain embodiments of the present invention to generate energy locally to power auxiliary equipment fitted to pipes or umbilicals at a subsea location and whereby surplus energy can be stored locally for future use.

According to a first aspect of the present invention there is provided a method of generating electrical power, comprising the steps of:
turning turbine blades of at least one turbine provided at a region of a subsea pipe or umbilical via respective motion of seawater through a swept area associated with the turbine blades; and
generating electrical power responsive to turning of the turbine blades.

Aptly, the method further comprises generating electrical power locally via the turbine on the pipe or umbilical and providing the power to auxiliary equipment on or proximate to the said region of the pipe or umbilical.

Aptly, the method further comprises providing the respective motion of seawater by continuously moving the turbine blades through a body of seawater.

Aptly, the method further comprises moving the turbine blades by moving the region of the pipe or umbilical to which the turbine is secured through the body of seawater.

Aptly, the method further comprises driving a driveshaft of the turbine as the turbine blades rotate; and
generating electrical power via a permanent magnet synchronous generator (PMSG) of the turbine responsive to rotation of the driveshaft.

Aptly, the method further comprises driving the drive shaft via a spur gear element driven by an internal or external gear member of the turbine that moves with the turbine blades.

Aptly, the method further comprises supporting ends of the turbine blades via a respective rotatable blade support secured to the pipe or umbilical via a respective bearing element.

Aptly, the method further comprises providing the respective motion of seawater by moving seawater with respect to the pipe or umbilical.

Aptly, the method further comprises the steps of generating electrical power when a current flows in the seawater.

Aptly, the method further comprises generating electrical power via a generator having a stator and a rotor driven by a shaft connected to the turbine blades.

Aptly, the method further comprises providing the power via a permanent electrical connection between the turbine and the auxiliary equipment.

Aptly, the method further comprises providing the power via a contactless connection between the turbine and the auxiliary equipment.

According to a second aspect of the present invention there is provided a method of providing electrical power to auxiliary equipment, comprising the steps of:
 via at least one turbine provided at, and movable with, a region of a pipe or umbilical at a subsea location, generating electrical power; and
 directly or indirectly powering auxiliary equipment via the generated power.

Aptly, the method further comprises generating electrical power locally to auxiliary equipment proximate to said region of the pipe or umbilical.

Aptly, the method further comprises powering the auxiliary equipment by providing the generated power to the auxiliary equipment via an electrical connection simultaneously as the power is generated.

Aptly, the method further comprises providing the power to the auxiliary equipment via a permanent or contactless connection.

Aptly, the method further comprises powering the auxiliary equipment by charging a power source with the generated power and subsequently providing power to the auxiliary equipment from the power source.

Aptly, the method further comprises charging at least one battery element or at least one capacitor element.

Aptly, the method of generating electrical power comprises generating an extra low voltage of about 24 volts rms or less.

Aptly, the method further comprises providing power to auxiliary equipment comprising a monitoring system for the pipe or umbilical.

Aptly, the method further comprises providing power to the auxiliary equipment comprising a wireless communication unit associated with a pipe or umbilical.

Aptly, the method further comprises providing power to auxiliary equipment comprising at least one heating element located at a region of the pipe or umbilical for preventing/reducing hydrate formation and/or wax accumulation in the pipe or umbilical.

Aptly, the method further comprises providing power to auxiliary equipment comprising a valve element or choke element of the pipe or umbilical.

According to a third aspect of the present invention there is provided a turbine for generating electrical power, comprising:
 a plurality of rotatable turbine blades associated with a swept area;
 a driveshaft that rotates as the turbine blades turn; and
 a power generator that generates electrical power responsive to rotation of the driveshaft; wherein
 the turbine is connectable to a region of a subsea flexible pipe or umbilical to generate power via respective motion of seawater through said swept area.

Aptly, the turbine generates electrical power locally at the pipe or umbilical and is connected to auxiliary equipment on or proximate to said a region.

Aptly, the auxiliary equipment comprises a power storage device.

Aptly, the power storage device comprises at least one rechargeable battery or capacitor.

Aptly, each of the blades has a first and a further end and the turbine comprises a first rotatable blade support connected to all of the first ends of the blades and a further rotatable blade support connected to all the further ends of the blades; and
 each blade support is located with respect to the pipe or umbilical via a ring connector and a bearing element between the ring connector and the blade support.

Aptly, the power generator comprises a permanent magnet synchronous generator (PMSG) having permanent magnets on a generator end region of said drive shaft.

Aptly, the drive shaft has a spur gear element at a blade end region driven by an internal or external gear member that moves with the turbine blade.

Aptly, the power generator is located in or on an end fitting of a flexible pipe.

Aptly, the pipe is a flexible pipe or steel catenary riser (SCR).

Aptly, the umbilical comprises a cable for supplying consumables.

According to a fourth aspect of the present invention there is provided apparatus constructed and arranged substantially as hereinafter described with reference to the accompanying drawings.

According to a fifth aspect of the present invention there is provided a method substantially as hereinafter described with reference to the accompanying drawings.

Certain embodiments of the present invention provide a method and apparatus for generating electrical power via a turbine provided at a region of a subsea pipe or umbilical. Current or tidal flow or movement of the pipe or umbilical with respect to a local body of sea water can this be utilised to generate electrical power locally at the pipe or umbilical.

Certain embodiments of the present invention enable auxiliary equipment such as monitoring systems or communication systems or the like to be powered locally at a subsea location using local motion of a pipe or umbilical with respect to the nearby sea water. This provides a more or less endless source of electrical power for the auxiliary equipment without the need for complex electrical connection systems or for batteries to be replaced or recharged.

Certain embodiments of the present invention provide a mechanism for generating electrical power at a subsea location. The electrical power may be provided via a contactless connector to a remotely operated vehicle (ROV) as required (on demand) without the ROV needing to return to a surface location to receive updated energy resource.

Certain embodiments of the present invention enable surplus energy to be stored in batteries or capacitance devices or transmitted via umbilicals to a platform/FPSO to supplement existing power supplies and/or provide green power. Power may also be directed downwards into a flow line pipe network for similar purposes or for heating and/or monitoring systems or to operate subsea equipment such as valves/chokes or the like.

Certain embodiments of the present invention provide a renewable energy source which has so far been unexploited.

Certain embodiments of the present invention will now be described hereinafter, by way of example only, with reference to the accompanying drawings in which.

In the drawings like reference numerals refer to like parts.

Figure 1:
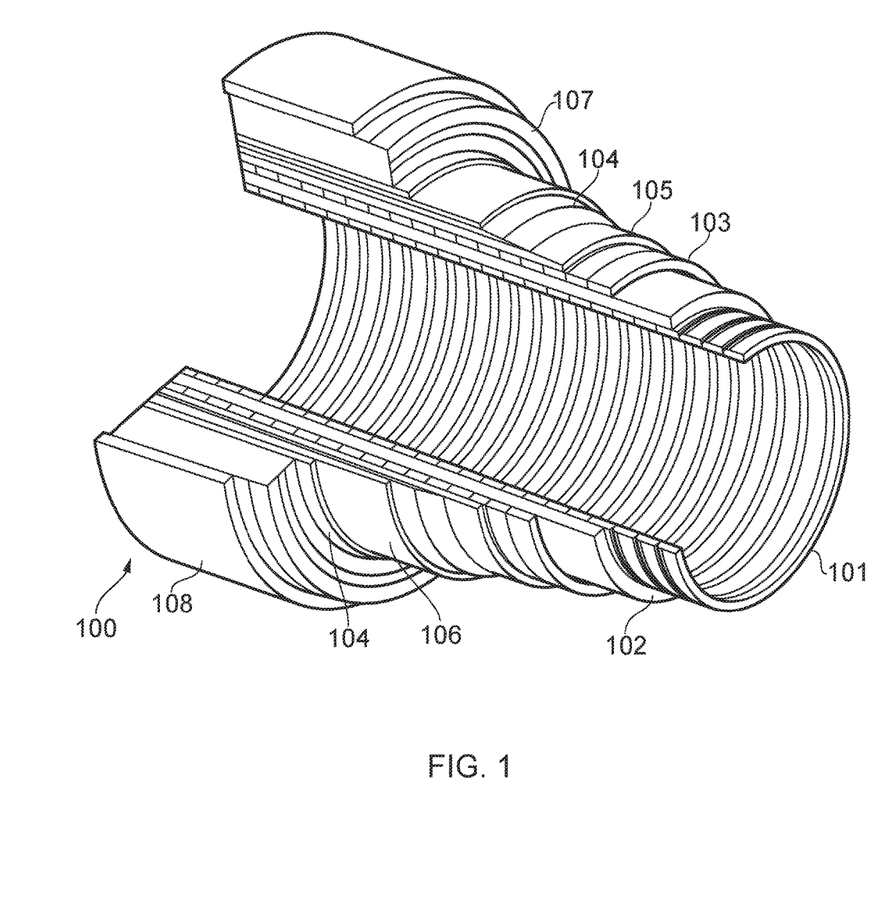
FIG. 1 illustrates flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how a portion of pipe body 100 (referred to as a segment) is formed from a combination of layered materials that form a pressure-containing conduit. Although a number of particular layers are illustrated in FIG. 1, it is to be understood that the present invention is broadly applicable to use with coaxial pipe body structures (or other similar elongate structures as later on described) including one or more layers manufactured from a variety of possible materials. For example, the pipe body may be formed from metallic layers, composite layers, or a combination of different materials. It is to be further noted that the layer thicknesses are shown for illustrative purposes only.

As illustrated in FIG. 1, pipe body includes an optional innermost carcass layer 101. The carcass provides an interlocked construction that can be used as the innermost layer to prevent, totally or partially, collapse of an internal pressure sheath 102 due to pipe decompression, external pressure, and/or tensile armour pressure and mechanical crushing loads. The carcass layer may be a metallic layer, formed from carbon steel, for example. Optionally the carcass layer could also be formed from composite, polymer, or other material, or a combination of materials. It will be appreciated that flexible pipes can provide 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass the internal pressure sheath may be referred to as a liner.

A pressure armour layer 103 is a structural layer with elements having a lay angle close to 90° that increases the resistance of the flexible pipe to internal and external pressure and mechanical crushing loads. The layer also structurally supports the internal pressure sheath, and is an interlocked construction of wires wound with a lay angle close to 9°.

The flexible pipe body also includes an optional first tensile armour layer 105 and optional second tensile armour layer 106. Each tensile armour layer is used to sustain tensile loads and internal pressure. The tensile armour layer may be formed from a plurality of metallic wires (to impart strength to the layer) that are located over an inner layer and are helically wound along the length of the pipe at a lay angle typically between about 10° to 55°. The tensile armour layers may be counter-wound in pairs. The tensile armour layers may be metallic layers, formed from carbon steel, for example. Optionally the tensile armour layers may be formed from composite, polymer, or other material, or a combination of materials.

The flexible pipe body shown also includes optional layers 104 of tape which each help contain underlying layers and may act as a sacrificial wear layer to help prevent abrasion between adjacent layers.

The flexible pipe body also includes optional layers of insulation 107 and an outer sheath 108, which comprises a polymer layer used to help protect the pipe against penetration of seawater and other external environments, corrosion, abrasion and mechanical damage.

Each flexible pipe thus comprises at least one portion or segment of pipe body 100 together with an end fitting located at at least one end of the flexible pipe. An end fitting provides a mechanical device which forms the transition between the flexible pipe body and a connector. The different pipe layers as shown, for example, in FIG. 1, are terminated in the end fitting in such a way as to transfer the load between the flexible pipe and the connector.

Figure 2:
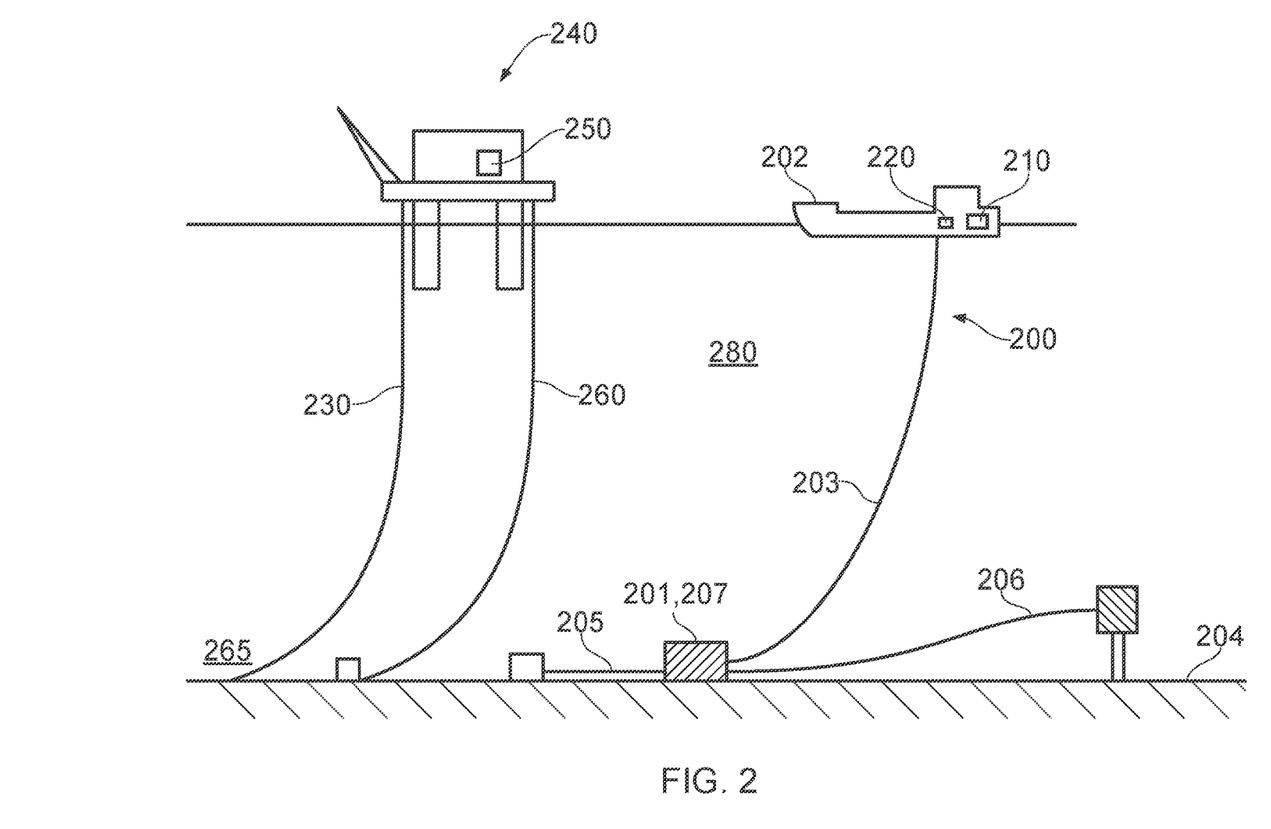
FIG. 2 illustrates use of a flexible pipe, umbilical and SCR.

FIG. 2 illustrates a riser assembly 200 suitable for transporting production fluid such as oil and/or gas and/or water from a subsea location 201 to a floating facility 202. For example, in FIG. 2 the subsea location 201 includes an end of a subsea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be a single segment or multiple segments of flexible pipe body with end fittings 207 connected end-to-end. The floating facility includes a ship power generator 210 and a battery bank 220 for supplying power on board the floating vessel.

It will be appreciated that there are different types of riser, as is well-known by those skilled in the art. Certain embodiments of the present invention may be used with any type of riser, such as a freely suspended riser (free, catenary riser), a riser restrained to some extent (buoys, chains) or totally restrained riser. Certain other embodiments of the present invention can be used as flow lines or jumpers or the like.

FIG. 2 also helps illustrate how a steel catenary riser (SCR) 230 can be utilised to connect a semi-submersible production platform 240 or other structure to a seabed location. The production platform 240 can be moored to the seabed and includes a power generation unit 250 for powering on board equipment. It will be appreciated that other floating platforms such as tension-leg platforms (TLPs) can also be connected to a subsea location via a pipe or other similar structure. FIG. 2 also helps illustrate how an umbilical 260 can be connected from the floating platform 240 to a subsea location 265. The umbilical can provide a wide range of ancillary products and services. Other umbilicals which do not extend all the way to a seabed are also used. For example an umbilical can be used as an electrical cable to provide power from one location to another. Optionally the umbilical can include optical fibre cables. An umbilical includes an outer sheath and one or more wires or lumens or conduits which extend along the length of the umbilical.

According to certain embodiments of the present invention the pipes, whether flexible or metal or umbilicals extend through a body of sea water 280. Tides or currents may flow in the sea water and movement of the pipe or umbilical can occur as the floating surface vessel moves up and down on the surface of the sea.

Figure 3:
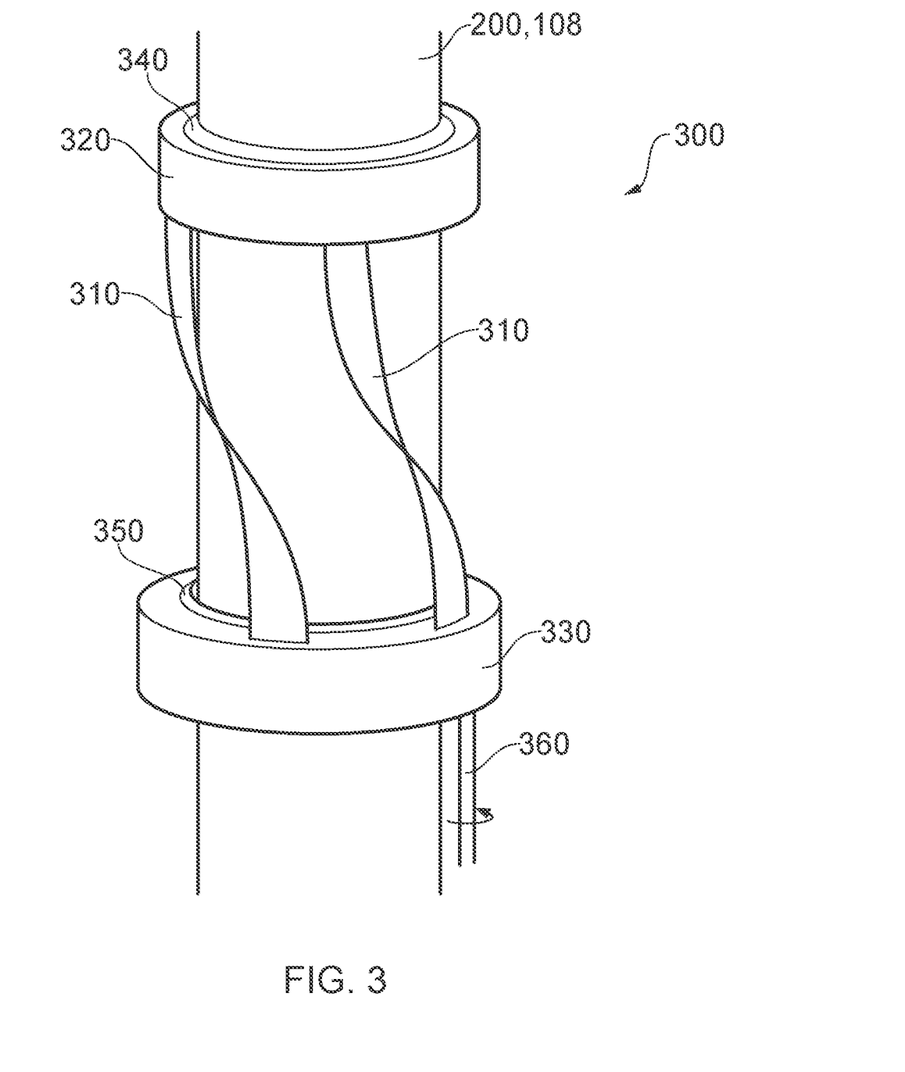
FIG. 3 illustrates a view of part of a turbine.

FIG. 3 illustrates a turbine for generating electrical power responsive to respective motion of the pipe or umbilical and the sea water. The turbine 300 includes turbine blades (two shown in FIG. 3) which are secured at respective ends to a first ring-like blade support 320 and a further ring-like blade support 330. These ring supports extend circumferentially around a pipe 200 and are secured to an outer sheath 108 of the flexible pipe or an end fitting via a ring-like connector. The ring-like connector 340 shown towards the top of FIG. 3 is fixedly secured to the pipe and a bearing (not shown) allows the upper most shown blade support 320 to freely spin with respect to the flexible pipe 200. Likewise the lower blade support 330 shown in FIG. 3 is secured via a bearing (not shown) to a lower ring-like connector 350 which is likewise secured to the outer sheath 108 of the flexible pipe 200. Again it will be appreciated that alternatively the turbine blades via the connectors may be secured to an end fitting, for example at a midline connection, of the flexible pipe, or indeed on a length of rigid pipe section situated in an in-line relationship between two flexible pipes, or alternatively to a rigid section of pipe connected to at least one end fitting of a flexible pipe and positioned in a co-axial relationship with said flexible pipe (where the flexible pipe runs through a section of rigid pipe). It will be appreciated that the connectors and supports enable the fan blades to spin freely around the longitudinal axis associated with the flexible pipe 200. The blades define a swept area as they rotate and respective motion of the flexible pipe and body of sea water in which the turbine blades are immersed causes rotatory motion of the blades and the blade supports. Rotation of the blades causes the lower blade support 330 shown in FIG. 3 to rotate and this causes respective rotation of a drive shaft 360 shown in FIG. 3. The drive shaft 360 rotates about a longitudinal drive shaft axis.

Figure 4:
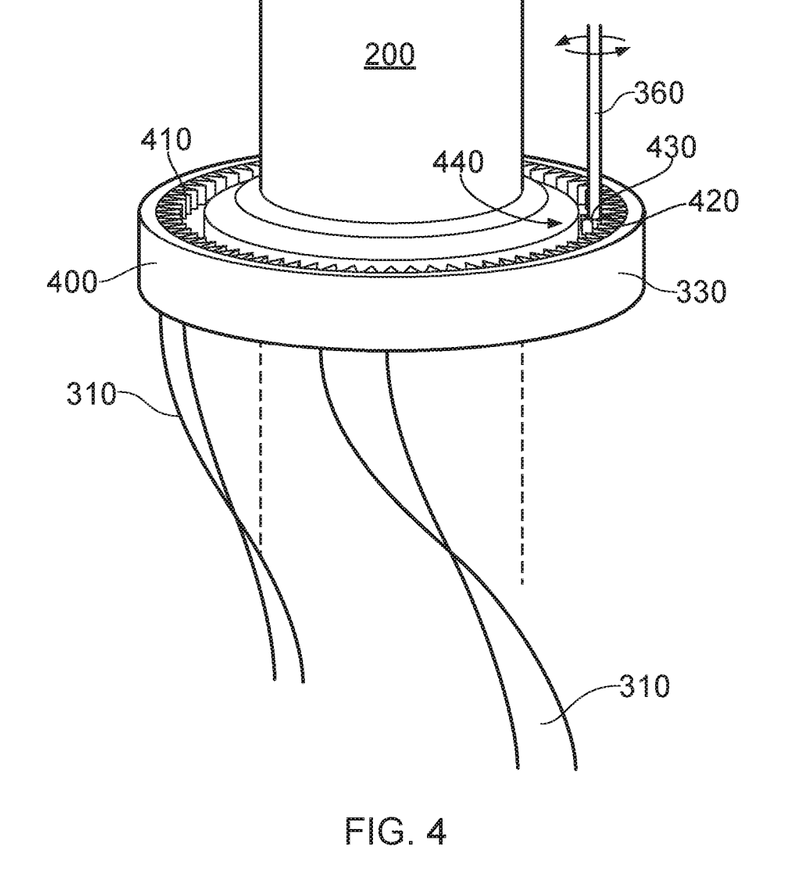
FIG. 4 illustrates an alternative view of part of a turbine.

FIG. 4 illustrates an underside of the blade support 330 shown in FIG. 3. The blade support 330 includes a blade body 400 which is hollow and has an internal gear 410. Optionally a sealed cover (not shown) is secured over the internal gear. As the blade support 330 rotates the teeth 420 of the internal gear 410 rotate and these drive corresponding teeth 430 of a spur gear 440 on the end of the drive shaft 360. Thus as a result of respective motion between the flexible pipe and a body of sea water in which the pipe is immersed the drive shaft 360 is caused to spin.

Figure 5:
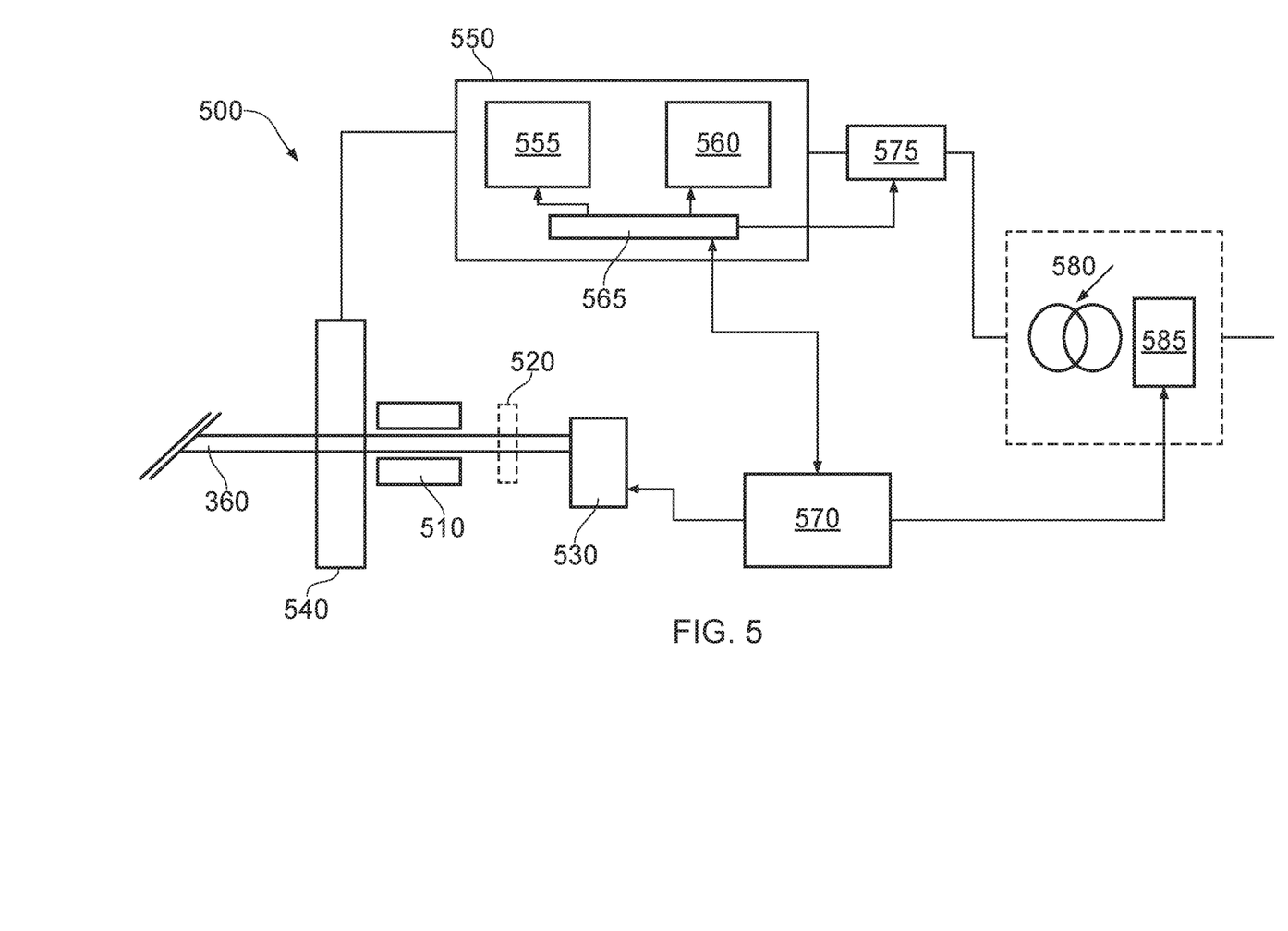
FIG. 5 illustrates a power generator of a turbine.

FIG. 5 helps illustrate further parts of the turbine and in more particular detail illustrates a permanent magnet synchronous generator (PMSG) 500. Other types of power generator that convert rotary motion to electrical power could be used. Also an optional inverter can be used to generate power regardless of a direction of rotation of the drive shaft. The drive shaft 360 is supported in a rotor bearing 510 and rotation of the drive shaft 360 is controlled by a brake 520 and pitch drive 530.

A synchronous generator 540 is used to generate electricity responsive to rotatory motion of the drive shaft 360. The generated power is connected to a frequency convertor 550 illustrated in FIG. 5 which includes a generator side convertor 555 and a line side convertor 560. A convertor controller 565 is controlled by a turbine control unit 570 which also controls the pitch drive. A main circuit breaker 575 receives a control signal from the convertor control unit 565 and an output of the frequency convertor is fed via the main circuit breaker 575 to a line coupling transformer 580 and medium voltage switch gear 585. The turbine for generating electrical power thus includes the multiple rotatable turbine blades and a drive shaft that rotates as the turbine blades 310 turn.

Figure 6:
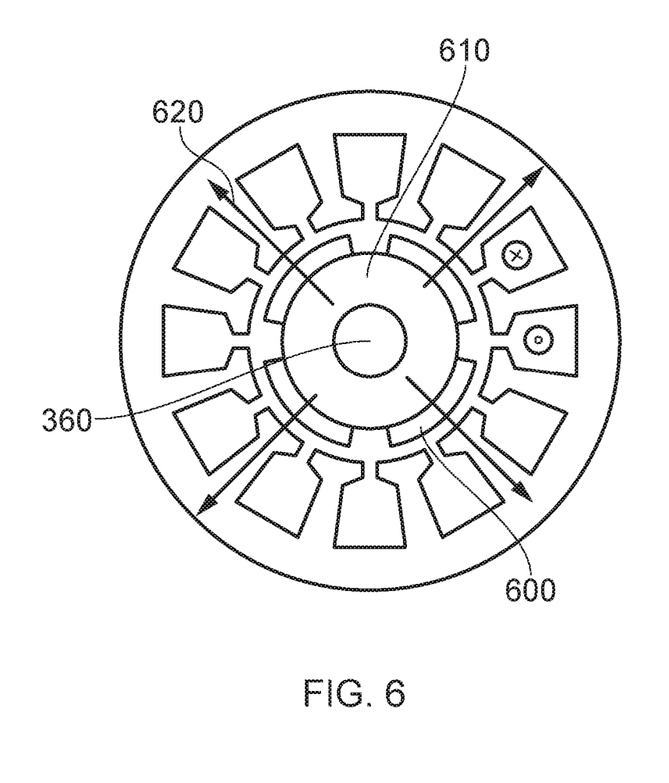
FIG. 6 illustrates permanent magnets of a PMSG type of power generator.

FIG. 6 helps illustrate how the central drive shaft 360 is secured to permanent magnets 600 (four shown in FIG. 6) via a rotatable mount 610. As the permanent magnets rotate they generate a magnetic flux (illustrated by bold arrows) 620 and these generate current in surrounding coils which are themselves made up from at least one wire wound into said coils. The current flow is shown by way of example in FIG. 6.

It will be appreciated that the shaft 360 and rotatable mount 610 may be hollow sections directly coupled to either the lower blade support 330 or the upper blade support 320, and the ring-like connectors 340 and 350 could be configured to encapsulate said spur on three sides and comprise the coils in which the current is generated as the turbine rotates.

Figure 7:
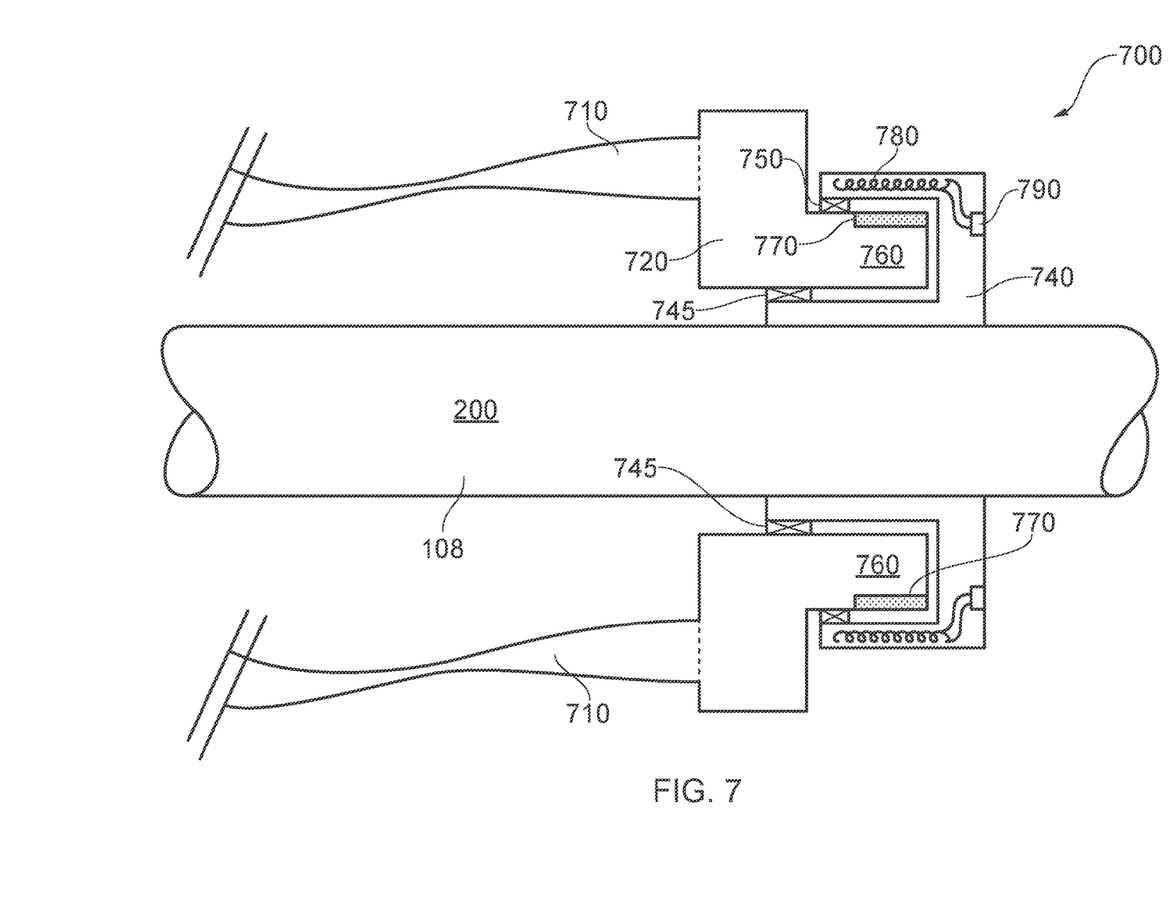
FIG. 7 illustrates an alternative view of a turbine.

FIG. 7 illustrates a turbine for generating electrical power responsive to respective motion of the pipe or umbilical and the sea water. The turbine 700 includes turbine blades 710 (two shown in FIG. 7) which are each secured at respective ends to a first ring-like blade support 720 and a further ring-like blade support (not shown). These ring supports extend circumferentially around a pipe 200 and are secured to an outer sheath 108 of the flexible pipe (or alternatively an end fitting) via a respective ring-like connector. The ring-like connector 740 shown in FIG. 7 is secured to the pipe 200 and an inner bearing 745 and outer bearing 750 allows the blade support 720 to freely spin with respect to the flexible pipe 200. It will be appreciated that a further ring-like connector and bearings secure the remaining end (not shown in FIG. 7) blade support. It will be appreciated that the bearings 745 and 750 may be substituted for contactless supports or the like in order to reduce or eliminate friction in the system and improve efficiency. For example, bearings 745 and 750 may be replaced with sets of additional permanent magnet pairs, each magnet in a pair presenting the same polarity to it's partner in the pair; in each pair one magnet is attached to, or embedded in the blade support 720 and the other attached to, or embedded in the ring-like connector 740. It will be appreciated that alternatively the turbine blades, via the connectors, could be secured to an end fitting, for example at a midline connection of a flexible pipe or indeed on a length of rigid pipe section situated in an in-line relationship between two flexible pipes. Alternatively connection can be made to a rigid section of pipe connected to at least one end fitting of a flexible pipe and positioned in a co-axial relationship with the flexible pipe.

As illustrated in FIG. 7 the connectors and supports enable the fan blades to spin freely around the longitudinal axis associated with the flexible pipe. The blades define a swept area as they rotate and respective motion of the flexible pipe and body of sea water in which the turbine blades are immersed causes rotatory motion of the blades and the blade support. Rotation of the blades causes the blade support 720 shown in FIG. 7 to rotate and this causes respective rotation of an end 760 of the support 720 which is enveloped within an annular recess in the connector 740. The end 760 of the blade support 720 has permanent magnets 770 distributed circumferentially on an outer surface facing a radially inner facing surface of the connector 740 in the recess of the connector 740. Thus as the blades 710 rotate permanent magnets which are secured in place around the periphery of the blade support rotate within the recess in the connector. Multiple coils 780 are located in the connector 740 and are spaced circumferentially around the whole circumference of the connector. Thus as the permanent magnets are caused to rotate power is supplied to connectors 790 for generating electrical power. It will be appreciated that similar permanent magnets and coils and connectors can of course be located at the remaining end (not shown) of the turbine in addition to or as an alternative to those shown in FIG. 7. Optionally the same permanent magnets 770 used in the generation of power may also be lengthened to extend further along the length of the end 760 of the support 720 in order for them to be used as part of the contactless bearing system described above, when opposed by suitably positioned pairings of magnets on or in the connector 740.

A power generator 500 generates electrical power responsive to rotation of the drive shaft. Whilst certain embodiments of the present invention have been described by way of securing a turbine to a flexible pipe it will be appreciated that certain other embodiments of the present invention are broadly applicable to the use of a turbine to generate electrical power when the turbine is secured to a pipe of any type or umbilical or similar elongate movable structure in the sea. Movement of a riser pipe or umbilical in a water column generates power or alternatively movement of water due to current or tidal action also creates power. The electricity generated is sufficient to power monitoring and communication systems and to enable remote wireless systems to operate independent of umbilical connections. It will be appreciated that other units can be connected into systems for heating a pipe structure for the purpose of preventing hydrate formation/wax accumulation in a pipe.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of generating electrical power, comprising the steps of:
   turning turbine blades of at least one turbine, wherein the at least one turbine is secured to an outer sheath or to an end fitting of either:
   a subsea pipe; or
   a subsea umbilical;
   wherein the turbine blades are turned via motion of seawater with respect to the subsea pipe or the subsea umbilical through a swept area associated with the turbine blades; and
   generating said electrical power responsive to the turning of the turbine blades;
   wherein each of the turbine blades has a first end and a second end and the turbine comprises a first rotatable blade support connected to all of the first ends of the turbine blades and a further rotatable blade support connected to all of the second ends of the blades, and each blade support encircles an outer periphery of the outer sheath or end fitting of the subsea pipe or subsea umbilical via a ring connector and a bearing element, the bearing element being located between the ring connector and the blade support; and
   wherein the blade supports and the ring connectors enable the turbine blades to turn around a longitudinal axis of the subsea pipe or subsea umbilical.

2. The method as claimed in claim 1, wherein auxiliary equipment is provided on or proximate to said outer sheath or end fitting, and wherein the method further comprises the step of providing said electrical power to said auxiliary equipment.

3. The method as claimed in claim 1, further comprising the step of:
   providing the motion of seawater with respect to the subsea pipe or the subsea umbilical by continuously moving the subsea pipe or subsea umbilical through a body of seawater to thereby continuously move the turbine blades through the body of seawater.

4. The method as claimed in claim 3, the method further comprising the step of:
   moving the turbine blades by moving said outer sheath or end fitting of the subsea pipe or the subsea umbilical through the body of seawater.

5. The method as claimed in claim 3, further comprising the steps of:
   driving a driveshaft of the turbine via the turning of the turbine blades; and
   generating the electrical power via a permanent magnet synchronous generator (PMSG) of the turbine responsive to rotation of the driveshaft.

6. The method as claimed in claim 1, further comprising the step of:
   providing the motion of seawater with respect to the subsea pipe or the subsea umbilical by moving seawater with respect to the subsea pipe or the subsea umbilical.

7. The method as claimed in claim 6, further comprising the step of:
   generating the electrical power when a current flows in the seawater.

8. The method as claimed in claim 2, further comprising the step of:
   providing the electrical power to the auxiliary equipment via a contactless connection between the turbine and the auxiliary equipment.

9. A method of providing electrical power to auxiliary equipment, comprising the steps of:
   generating said electrical power via at least one turbine comprising turbine blades secured to an outer sheath or to an end fitting of either:
   a subsea pipe; or
   a subsea umbilical; and
   directly or indirectly providing said electrical power to the auxiliary equipment;
   wherein each of the turbine blades has a first end and a second end and the turbine comprises a first rotatable blade support connected to all of the first ends of the turbine blades and a further rotatable blade support connected to all of the second ends of the turbine blades, and each blade support encircles an outer periphery of the outer sheath or end fitting of the subsea pipe or subsea umbilical via a ring connector and a bearing element, the bearing element being located between the ring connector and the blade support; and wherein the blade supports and the ring connectors enable the turbine blades to spin around a longitudinal axis of the subsea pipe or subsea umbilical to thereby generate said electrical power.

10. The method as claimed in claim 9, wherein the auxiliary equipment is proximate to said outer sheath or end fitting.

11. The method as claimed in claim 9,
wherein the electrical power is provided directly to the auxiliary equipment via an electrical connection such that the electrical power is provided simultaneously as the electrical power is generated.

12. The method as claimed in claim 11,
wherein the generated electrical power is provided to the auxiliary equipment via a permanent or contactless connection.

13. The method as claimed in claim 10,
wherein the electrical power is provided indirectly to the auxiliary equipment by first charging a power source with the generated electrical power and subsequently providing power to the auxiliary equipment from the power source.

14. The method as claimed in claim 9,
wherein generating the electrical power comprises generating an extra low voltage of around 24 volts root square mean (RMS) or less.

15. A turbine for generating electrical power, comprising:
a plurality of rotatable turbine blades associated with a swept area;
a driveshaft that rotates as the turbine blades rotate; and
a power generator that generates said electrical power responsive to the rotation of the driveshaft;
wherein the turbine is secured to an outer sheath or to an end fitting of either:
a subsea flexible pipe; or
a subsea umbilical;
wherein the rotation of said turbine blades is caused by motion of seawater with respect to the subsea pipe or subsea umbilical through said swept area;
wherein each of the turbine blades has a first end and a second end and the turbine comprises a first rotatable blade support connected to all of the first ends of the turbine blades and a second rotatable blade support connected to all of the second ends of the turbine blades, and each blade support encircles an outer periphery of the outer sheath or end fitting of the subsea pipe or subsea umbilical via a ring connector and a bearing element, the bearing element being located between the ring connector and the blade support; and wherein the blade supports and the ring connectors enable the turbine blades to rotate around a longitudinal axis of the subsea pipe or subsea umbilical.

16. The turbine as claimed in claim 15, wherein:
the turbine is connected to auxiliary equipment, wherein the auxiliary equipment is on or proximate to said outer sheath or end fitting.

17. The turbine as claimed in claim 15,
wherein the power generator comprises a permanent magnet synchronous generator (PMSG) having permanent magnets on a generator end region of said driveshaft.

18. The turbine as claimed in claim 15 wherein the power generator is located on an end fitting of the subsea flexible pipe or the subsea umbilical.

19. A turbine for generating electrical power, comprising:
a plurality of rotatable turbine blades associated with a swept area;
a driveshaft that rotates as the turbine blades rotate; and
a power generator that generates said electrical power responsive to the rotation of the drive shaft;
wherein the turbine is secured to a rigid section, the rigid section connected to at least one end fitting of a subsea pipe;
wherein the rotation of said turbine blades is caused by motion of seawater with respect to the subsea pipe, the seawater flowing through said swept area;
wherein each of the turbine blades has a first end and a second end and the turbine comprises a first rotatable blade support connected to all of the first ends of the turbine blades and a second rotatable blade support connected to all of the second ends of the turbine blades;
wherein each blade support encircles an outer periphery of the rigid section or the end fitting of the subsea pipe via a ring connector and a bearing element, the bearing element being located between the ring connector and the blade support;
wherein the blade supports and the ring connectors enable the turbine blades to rotate around a longitudinal axis of the subsea pipe; and
wherein the subsea pipe is a steel catenary riser (SCR).

20. The method of generating power as claimed in claim 1 wherein each turbine blade comprises free side edges, and wherein each turbine blade is elongate in form, extending between the first rotatable blade support and the second rotatable blade support, along a longitudinal blade axis which is not coincident with the longitudinal axis of the subsea pipe.

21. The turbine as claimed in claim 15 wherein each turbine blade comprises free side edges, and wherein each turbine blade is elongate in form, extending between the first rotatable blade support and the second rotatable blade support, along a longitudinal blade axis which is not coincident with the longitudinal axis of the subsea pipe.

* * * * *

UNITED STATES PATENT AND TRADEMARK OFFICE
CERTIFICATE OF CORRECTION

PATENT NO. : 10,125,738 B2
APPLICATION NO. : 14/915578
DATED : November 13, 2018
INVENTOR(S) : Richard Clements Page 1 of 1

It is certified that error appears in the above-identified patent and that said Letters Patent is hereby corrected as shown below:

In the Claims

Column 11, Line 33, in Claim 14, change "square mean" to --mean square--.

Column 12, Line 20, in Claim 19, change "drive shaft;" to --driveshaft;--.

Signed and Sealed this
Fifth Day of March, 2019

Andrei Iancu
*Director of the United States Patent and Trademark Office*